June 15, 1954  H. C. FRENTZEL  2,681,074
DUAL FLOW RELIEF VALVE
Filed Jan. 26, 1951  2 Sheets-Sheet 1
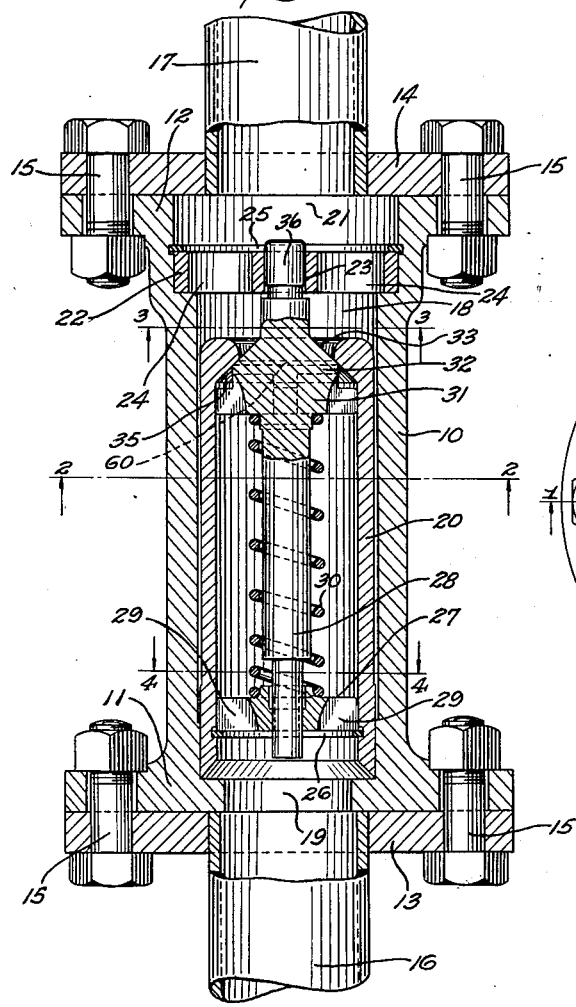
Fig. 1.
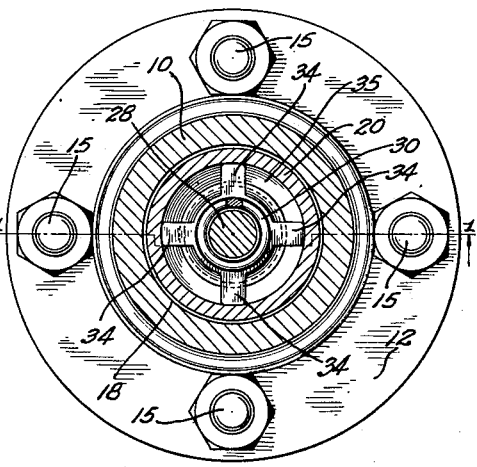
Fig. 2.
Fig. 4.
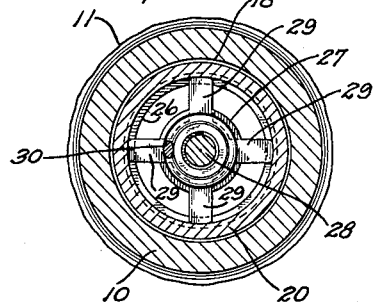
Fig. 3.
INVENTOR.
Herman C. Frentzel,
BY Morsell & Morsell
ATTORNEYS.

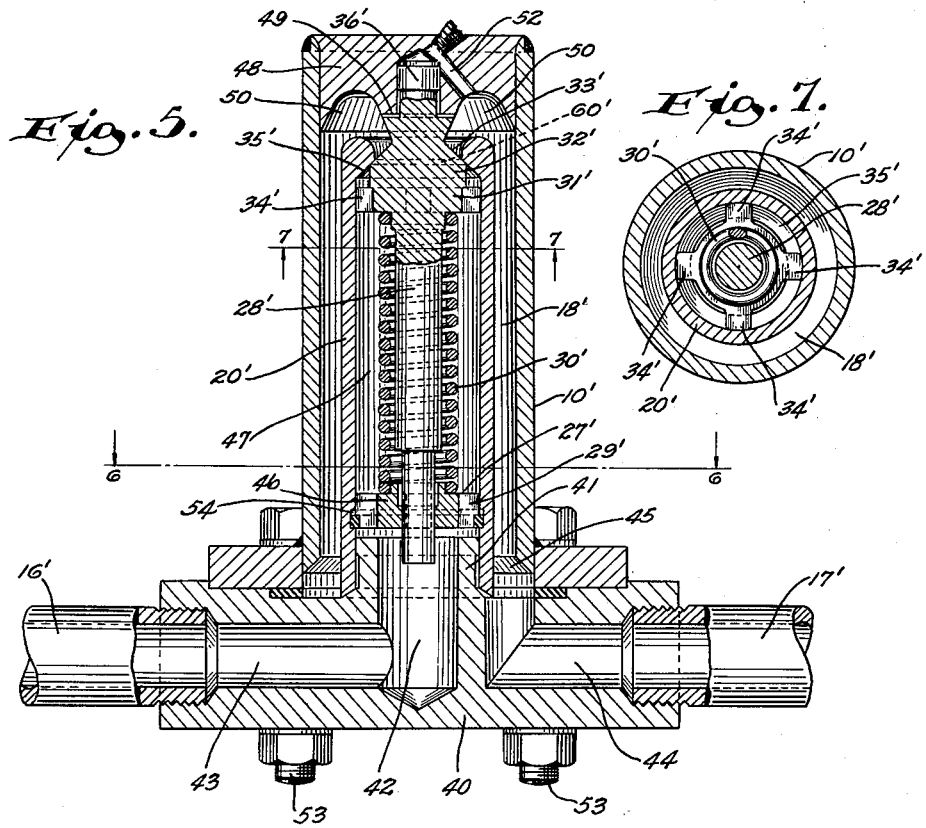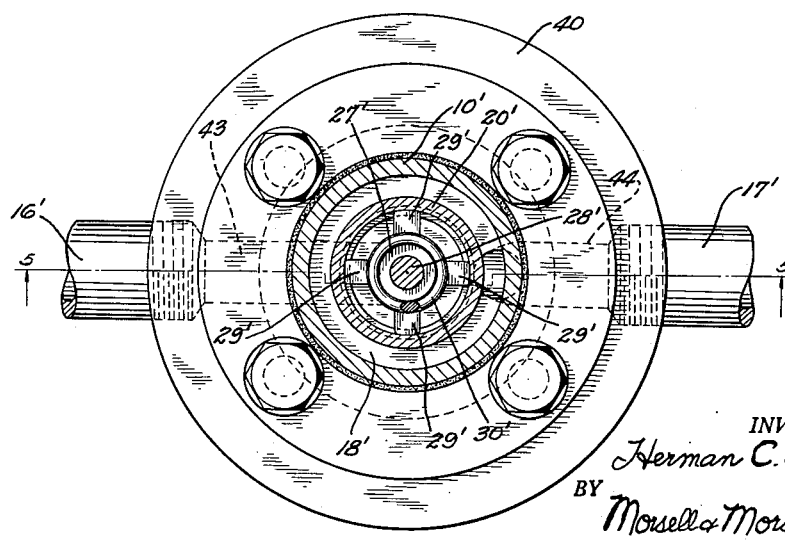

Patented June 15, 1954

2,681,074

UNITED STATES PATENT OFFICE 2,681,074

DUAL FLOW RELIEF VALVE

Herman C. Frentzel, Milwaukee, Wis.

Application January 26, 1951, Serial No. 207,976

3 Claims. (Cl. 137—493)

This invention relates to improvements in dual flow relief valves.

In various types of hydraulic systems where it is necessary to have the fluid under pressure flow, under certain conditions, in opposite directions, it is the conventional practice to utilize in the hydraulic system a separate relief valve for each direction of flow of the hydraulic fluid. The present invention, however, eliminates the need for several independent relief valves in a hydraulic system of the type mentioned by providing a single unitary relief valve which, however, operates and permits the flow of fluid under predetermined pressures in either direction.

A more specific object of the invention is to provide a dual flow relief valve of very simple construction and utilizing a minimum number of parts and wherein the flow of fluid in either direction can be controlled by a unitary structure embodying a single spring and valve plunger.

A further specific object of the invention is to provide a dual flow relief valve which is devoid of threads or the like in its internal construction which might be susceptible of corrosion, thereby making the valve especially suited for use in hydraulic systems which handle acids.

A further specific object of the invention is to provide a dual flow relief valve susceptible of easy assembly and disassembly, and which is readily adjustable to adapt it to varying fluid pressure conditions in opposite directions.

A further specific object of the invention is to provide a dual flow relief valve which may be arranged so that the pressure can be relieved in one direction proportionately different than the relief of fluid pressure in the opposite direction, or wherein the relief pressures in both directions are equal.

A further specific object of the invention is to provide a dual flow relief valve in which the internal surface areas which may be contacted by the fluid flowing therethrough are reduced to a minimum and wherein friction between the operating parts of the valve is minimized because of relatively small metal sliding contacts in the valve mechanism.

A further object of the invention is to provide a dual flow relief valve which is simple in construction and operation, which is compact and susceptible of installation in restricted portions of hydraulic systems, which is relatively inexpensive, which is strong and durable, and which is well adapted for the purposes described.

With the above and other objects in view the invention consists of the improved dual flow relief valve and its parts and combinations as set forth in the claims, and all equivalents thereof.

In the accompanying drawings in which the same reference characters indicate the same parts in all of the views:

Fig. 1 is a longitudinal sectional view of one form of the improved dual flow relief valve;

Fig. 2 is a cross sectional view taken on line 2—2 of Fig. 1;

Fig. 3 is a cross sectional view taken on line 3—3 of Fig. 1;

Fig. 4 is a cross sectional view taken on line 4—4 of Fig. 1;

Fig. 5 is a longitudinal sectional view of a modified form of dual flow relief valve embodying the invention;

Fig. 6 is a cross sectional view taken on line 6—6 of Fig. 5; and

Fig. 7 is a cross sectional view taken on line 7—7 of Fig. 5.

Referring now particularly to the form of the invention illustrated in Figs. 1 to 4 inclusive, it will be observed that the dual flow relief valve includes a shell or casing 10 of generally cylindrical formation, and provided at opposite extremities with flanges 11 and 12 against which coupling plates 13 and 14 are secured by bolts 15. The inner ends of separated fluid conduits 16 and 17 have force fits or are otherwise secured within central openings in the coupling plates 13 and 14 respectively. Interiorly the shell or casing 10 is provided throughout the major extent of its length with a cylindrical bore 18. One end of said bore communicates with a bore 19 of reduced diameter which is in registration with the inner end of the fluid conduit 16. Because of the reduced diameter of the bore 19, an annular shoulder is formed at the adjacent end of the bore 18 which is engaged by an end portion of a hollow sleeve 20 mounted for longitudinal reciprocatory movement within the bore 18, the sleeve 20 being of less length than the bore 18. The interior of the casing 10 at the end of the bore 18 opposite the reduced bore 19, is provided with an enlarged opening 21 communicating with the inner end of the fluid conduit 17. Within said enlarged opening 21 there is fixedly seated on the annular shoulder formed thereby a valve stem guide disk 22 having a central opening 23 therein and spaced openings 24. The latter provide for fluid flow from the conduit 17 and opening 21 into the shell bore 18 or vice versa. The guide disk 22 is held in its assembled position by a retainer ring 25.

At the opposite end of the bore 18 seated within an annular recess is a retainer ring 26 which supports a valve stem guide 27. As will be observed from Fig. 4, said valve stem guide has a central apertured hub portion through which the adjacent end portion of a valve stem 28 slidably extends, and radiating outwardly from the central hub portion of the member 27 are spaced ribs 29 which, merging with the central hub portion, formed a grooved support for one end of a spring 30 which is coiled about the valve stem 28 and engages at its other end an enlarged valve plunger 31 which is integral with the adjacent end of the valve stem. The end of the valve stem opposite the plunger 31 is reduced and shouldered, as shown in Fig. 1, to limit the reciprocation of the valve stem in the direction toward the guide 27.

The valve plunger 31 has an enlarged intermediate portion 32 of cylindrical formation and the portion outwardly thereof is in the form of a frustum of a cone. Inwardly of the cylindrical midportion 32 of the valve plunger the same is reduced in diameter on a gradual radius. The narrow cylindrical portion 32 of the valve plunger, as well as the frusto-conical surface 33 outwardly thereof, are of importance in respect to the cooperation of the valve assemblage areas against which fluid pressure may react in the several directions. The portion of the valve plunger 31 inwardly of its cylindrical portion 32 carries an integral guide and spring seat which includes radial webs 34, the same being spaced apart to permit fluid flow therebetween. Beyond the valve plunger 31 there is a projecting, shouldered extension 36 of the valve stem which is guided for limited reciprocatory movement in the central opening 23 in the guide disk 22.

The end of the sleeve 20 adjacent the valve plunger 31 surrounds the latter and is formed with an annular inturned rim on the inner surface of which there is an annular inclined wall 35 which coincides with and corresponds to the inclination of the frusto-conical portion 33 of the valve plunger, having a degree of contact therewith, as shown by the dotted line area 60 in Fig. 1, in the closed position of the valve, which annular area may be termed the contact ring between the valve plunger 31 and inclined wall 35.

In the operation of the form of dual flow valve shown in Figs. 1 to 4 inclusive, if it be assumed that the fluid flow and pressure is through the conduit 16 in a direction toward the interior of the valve casing 10, the fluid will flow into the interior of the hollow sleeve 20 and will react against the exposed interior inclined surface portions 35 of the rim portion of the sleeve. When the fluid pressure builds up to a point where it can overcome the resistance of the coiled spring 30, it will move the sleeve 20 longitudinally in a direction toward the conduit 17 while the valve stem 28 and valve plunger 31 remain stationary, thereby disengaging the inclined interior surface of the sleeve from the frusto-conical surface 33 of the valve plunger, opening up communication from the interior of the sleeve through the bore portion 18, openings 24 and bore enlargement 21 into the conduit 17, thereby permitting fluid flow or pressure relief in a direction outwardly of the conduit 17. When the fluid pressure reacting against the surface 35 of the sleeve is relieved or overcome, the pressure of the spring 30 will reciprocate the sleeve 20 in the opposite direction, re-engaging the valve plunger and sleeve surface 35, thereby closing the valve in respect to fluid flow or pressure relief in the direction mentioned.

On the other hand, should the fluid flow or fluid pressure be from the conduit 17 into the enlarged portion 21 of the casing 10, then, the force of the fluid is directly against the exposed frusto-conical surface 33 of the valve plunger 31. When the fluid pressure reacting thereagainst is sufficient to overcome the force of the spring 30, the valve plunger 31 and its stem 28 will be reciprocated in an axial direction toward the conduit 16 and away from the internal inclined surface 35 of the sleeve, thereby opening up communication to the interior of the sleeve with relief of the pressure or flow of fluid continuing outwardly through the conduit 16. When the force of the fluid pressure is sufficiently relieved, the spring 30 will reciprocate the valve stem and valve plunger back to its normal closed position with relation to the sleeve 20.

If the pressure is in an upward direction relative to Fig. 1 the effective pressure area is the area of the outside diameter of sleeve 20 minus the area of the contact ring 60. When the pressure is in the opposite direction the effective pressure area then becomes the equivalent of the area encompassed by the contact ring 60.

In the valve illustrated in Figs. 1 to 4 inclusive, the areas against which the fluid reacts in both directions are equal, with the result that the valve illustrated will relieve equal fluid pressures in both directions. It is obvious, however, that if different fluid pressures were to be controlled in opposite directions, this could be accomplished by varying the relative areas of the assemblage surfaces against which the fluid reacts in the several directions, and the pressures are inversely proportioned to the ratio of the fluid pressure reaction surfaces.

The form of dual relief valve shown in Figs. 1 to 4 inclusive is designed for use in assemblages where it is convenient to have the two fluid conduits 16 and 17, intersected by the valve assemblage, enter and communicate with opposite ends of the valve casing. A modified form of the invention is illustrated in Figs. 5 to 7 inclusive, wherein the valve assemblage is in the form of an inverted T with the fluid conduits 16' and 17' arranged to communicate with the same end of the valve casing. In the modified form of the invention the component parts of the valve are in the main quite similar to those utilized in the principal form of the invention and to eliminate repetition in the description of such elements certain portions of the valve assemblage in Figs. 5 to 7 inclusive bear primed numerals to show their correspondence to those elements in the principal form of the invention bearing similar unprimed reference numerals.

As will be observed from Fig. 5, the lower end of the valve casing 10' in the modified form of the invention is secured within an enlarged circular ported plate 40 which has a central upstanding hub portion 41 formed with an upwardly opening axial socket 42 therein. The inner end of the latter is in communication with a radial bore 43 in the plate 40, the latter being in communication with the inner end portion of a fluid pressure conduit 16' secured within said plate 40.

Entering the plate 40 at a point diametrically opposite to the entry of the fluid conduit 16' is a fluid conduit 17' whose inner end is in communication with an angular port 44 within the plate 40.

Spacedly surrounding the central hub portion 41 of the plate 40 is an annular space 45. Spacedly positioned within the casing 10' is a reciprocatory hollow sleeve 20' whose lower end is positioned between the inner edge of the ring 45 and the hub 41. Within the casing 10' and between its inner wall and the outer wall of the sleeve 20' there is an annular space 18' which is in communication with the inner end of the angular bore 44 and which provides for fluid flow within the casing 10' exteriorly of the sleeve 20'.

Mounted fast on the upper end of the hub 41 of the plate 40 is a valve stem retainer 27' having a central bored hub portion 46 through which the lower reduced end portion of a valve stem 28' slidably extends, and angularly spaced apart radial webs 29'. The upper end of the socket 42 provides for fluid communication, between the webs 29', with the chamber 47 which is interiorly of the sleeve 20'.

The upper end portion of the valve stem 28' has integral therewith an enlarged valve plunger 31' shaped substantially similarly to the valve plunger 31 of the principal form of the invention and having a frusto-conical surface 33' adapted, in the closed condition of the valve, to contact a peripheral portion of the internal inclined surface 35' of the inturned upper end of the sleeve 20'. Above the valve plunger 31' there is an integral valve stem extension 36' arranged for limited movement within a bore therefor in the closed upper head 48 of the valve casing. Surrounding the valve stem 28' and having its opposite ends bearing against the retainer guide 27' and the inner face of the plunger 31' respectively, is a coiled spring 30'.

In the operation of the form of valve shown in Figs. 5 to 7 inclusive, if it be assumed first that the fluid flow and pressure is through the conduit 17' in a direction toward the interior of the valve casing, it will be obvious that the fluid flows through the angular port 44 and into the space 18' between the sleeve 20' and the valve casing 10'. When the pressure builds up to a predetermined value it will react against the inclined surface 33' of the valve plunger 31' and depress it against the tension of the spring 30', thereby disengaging the valve plunger from the inclined surface 35' of the sleeve rim and opening up communication to the chamber 47 within the sleeve 20'. The effective pressure area is in fact equivalent to the area encompassed by the contact ring 60. The fluid or pressure is then free to exhaust from the interior of the sleeve through the socket 42, bore 43, into the conduit 16'. When the fluid pressure reacting downwardly against the plunger surface 33' is relieved or overcome, the force of the spring 30' will raise the valve stem and plunger 31' to re-engage the complementary surfaces 33' and 35' thereby closing the valve in respect to fluid flow or pressure in the direction mentioned.

Conversely, should the fluid flow or pressure be from the conduit 16' into the bore 43 and from the socket 42 into the chamber 47 within the sleeve 20', when a sufficient pressure is built up it will react against the internal inclined surface 35' of the sleeve 20' to ultimately move the entire assemblage which includes the sleeve 20', valve stem 28', and valve plunger 31' until the upper end of the valve plunger contacts a shoulder 49 within the casing head 48. When the pressure approaches the predetermined relief pressure the effective pressure area is in fact the inside diameter of the sleeve 20' (where it contacts the central hub 41) minus the area of the contact ring 60. The fluid pressure then elevates the sleeve 20' to disengage it from the valve plunger surface 33', thereby opening up communication between the upper end of the sleeve chamber 47 and the space 18' exteriorly of the sleeve. Upon the relief of the excess fluid pressure the reaction of the coiled spring 30' will return the valve parts to normal position re-engaging the surfaces 33' and 35', thereby closing the valve.

Within the casing head 48 are dome shaped cavities 50 which accommodate the upper end of the sleeve 20' in its upward reciprocation. Also, leading off of one of the cavities 50 is an angularly directed port 52 opening interiorly of the head 48 to vent the upper end of the valve plunger.

In the modified form of the invention the assemblage is held together by the bolts 53, while in the principal form of the invention the bolts 15 serve the same purpose. If these bolts are removed, permitting disengagement of the base plate 40 of the valve of Fig. 5 or the coupling plates 13 and 14 of the valve of Fig. 1 access may be had to the interior of the valve assemblages for disassembly or cleaning. In the valve of Fig. 1 the movable parts within the casing 10 are retained in assembled condition by the rings 25 and 26, which may be split spring rings and which, when snapped out of their retaining grooves, will permit withdrawal of the internal elements. With respect to the valve of Fig. 5, the same may be accomplished by snapping the retaining ring 54 out of its sleeve groove. Both forms of dual flow relief valves are, so far as their internal mechanism is concerned, entirely devoid of screw threads or other securing arrangements which might be subject to corrosion if the valves are used in hydraulic systems handling acids. It is also to be observed that fluid flow or pressure in either direction is controlled by the same valve plunger operating against the tension of a single coiled spring. The improved valves have a minimum of metal-to-metal contact with respect to the parts which move relative to one another.

Obviously, only a single improved valve is required in a hydraulic system where fluid flow or pressure relief from opposite directions is to be controlled. While the valve illustrated includes a valve casing, in certain installations where desirable, the casing may be eliminated and the sleeve and valve plunger assemblage as a unit may be installed within the casing of a fluid pump, control valve or the like.

The improved dual flow relief valve is of very simple construction, utilizes a minimum number of parts, may be completely included in a hydraulic system and is otherwise well adapted for the purposes described.

What is claimed as the invention is:

1. A dual flow controlled valve, comprising a pair of fluid conduits, each adapted for fluid flow therethrough in either direction, a casing into which each of said conduits opens at spaced-apart positions, a hollow imperforate sleeve reciprocatably mounted within the casing and forming a conduit for fluid flow therethrough in either direction, said sleeve being provided with an end port in communication with one of said conduits and directing fluid into or out of said sleeve during fluid flow from one conduit to the other, said sleeve having an internal fluid pressure reaction surface inwardly of said port, a valve plunger reciprocatably mounted within the sleeve controlling said port and having an outer fluid pressure reaction surface, a portion of which is normally in sealing engagement with a portion of the fluid pressure reaction surface of the sleeve, and a spring reacting against said valve plunger to normally maintain said engaging relation between said pressure reaction surfaces, fluid pressure reacting against one of said fluid pressure reaction surfaces in either direction of fluid flow in excess of a predetermined value overcoming the force of said spring in either direction and permitting a temporary reciprocation of one of said reciprocatory members to disengage the engaging surfaces thereof and open said port.

2. A dual flow control valve, comprising a pair of separated fluid conduits, each adapted for fluid flow therethrough in either direction, a casing into which each of said conduits opens at spaced-apart positions, a hollow imperforate sleeve reciprocatably mounted within the casing and forming a conduit for fluid flow therethrough in either direction, said sleeve being provided with an end port in communication with one of said conduits and directing fluid into or out of said sleeve during fluid flow from one conduit to the other, said sleeve having an internal fluid pressure reaction surface inwardly of said port vulnerable only to fluid pressure within the sleeve supplied from one of said conduits, a valve plunger reciprocatably mounted within the sleeve controlling said port and having an outer fluid pressure reaction surface vulnerable only to fluid pressure within the casing exteriorly of the sleeve and supplied from the other of said conduits, a continuation of the latter surface being normally in sealing engagement with a continuation of the fluid pressure reaction surface of the sleeve, and a spring reacting directly against said valve plunger to normally maintain said engaging relation between said pressure reaction surfaces continuations, fluid pressure reacting against one of said fluid pressure reaction surfaces in either direction of fluid flow in excess of a predetermined value overcoming the force of said spring and permitting a temporary reciprocation of one of said reciprocatory members to disengage the engaging surfaces thereof and open said port.

3. A dual flow controlled valve, comprising a pair of fluid conduits, each adapted for fluid flow therethrough in either direction, a casing into which each of said conduits opens at spaced-apart positions, a hollow imperforate sleeve reciprocatably mounted within the casing and forming a conduit for fluid flow therethrough in either direction, said sleeve being provided with an end port in communication with one of said conduits and directing fluid into or out of said sleeve during fluid flow from one conduit to the other, said sleeve having an internal fluid pressure reaction surface adjacent said port and a plug seat, a valve plug reciprocatably mounted within the sleeve controlling said port and having an outer fluid pressure reaction surface and an extended surface portion which is normally in sealing engagement with a portion of the fluid pressure reaction surface of the sleeve, and a spring reacting directly against said valve plug to normally maintain its extended surface in engagement with said plug seat, fluid pressure reacting against one of said fluid pressure reaction surfaces in either direction of fluid flow in excess of a predetermined value overcoming the force of said spring and permitting a temporary reciprocation of one of said reciprocatory members to disengage the plug from the seat, the relationship of the area of the fluid pressure reaction surface of the sleeve to that of the fluid pressure reaction surface of the plug determining the relationship of fluid pressure which may be relieved in one direction relative to the amount of fluid pressure susceptible of relief in the other direction.

References Cited in the file of this patent

UNITED STATES PATENTS

| Number | Name | Date |
| --- | --- | --- |
| 997,885 | Werts | July 11, 1911 |
| 1,273,347 | Ferris | July 23, 1918 |
| 1,719,028 | Stawdlee | July 2, 1929 |
| 1,729,820 | Campbell | Oct. 1, 1929 |
| 1,985,936 | Loweke | Jan. 1, 1935 |

FOREIGN PATENTS

| Number | Country | Date |
| --- | --- | --- |
| 21,035 | Great Britain | Oct. 16, 1914 |
| 41,354 | Holland | Aug. 16, 1937 |
| 692,383 | Germany | June 19, 1940 |